United States Patent
Yokel et al.

(10) Patent No.: US 10,148,819 B2
(45) Date of Patent: Dec. 4, 2018

(54) TEAM-BASED CUSTOMER CARE ROUTING

(71) Applicant: T-Mobile USA, Inc.

(72) Inventors: Ryan Yokel, Seattle, WA (US); Rudy Bourcelot, Everett, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 43 days.

(21) Appl. No.: 15/394,053

(22) Filed: Dec. 29, 2016

(65) Prior Publication Data

US 2018/0191903 A1    Jul. 5, 2018

(51) Int. Cl.
*H04M 3/523* (2006.01)
*H04M 3/42* (2006.01)
*H04M 3/51* (2006.01)

(52) U.S. Cl.
CPC ..... *H04M 3/5232* (2013.01); *H04M 3/42068* (2013.01); *H04M 3/5191* (2013.01); *H04M 2203/408* (2013.01)

(58) Field of Classification Search
CPC ........... H04M 3/523; H04M 2203/408; H04M 3/42102; H04M 3/42365; H04M 3/5232
See application file for complete search history.

(56) References Cited

U.S. PATENT DOCUMENTS

| 7,688,963 | B1* | 3/2010 | Lang | H04M 3/12 379/215.01 |
|---|---|---|---|---|
| 8,175,255 | B2 | 5/2012 | Ruckart | |
| 8,582,750 | B2* | 11/2013 | Lee | H04M 3/12 379/265.02 |
| 8,855,292 | B1* | 10/2014 | Brunson | H04M 3/523 379/266.01 |
| 8,913,736 | B2* | 12/2014 | Kohler | H04M 3/5238 379/265.11 |
| 2010/0010823 | A1 | 1/2010 | Scipioni et al. | |
| 2012/0213342 | A1 | 8/2012 | Paden et al. | |
| 2014/0375749 | A1 | 12/2014 | Kay et al. | |
| 2016/0212267 | A1 | 7/2016 | Ma et al. | |

OTHER PUBLICATIONS

International Search Report and Written Opinion for PCT Application No. PCT/US2017/068691, dated Apr. 19, 2018, 13 pages.

* cited by examiner

*Primary Examiner* — Nafiz E Hoque
(74) *Attorney, Agent, or Firm* — Hans Santos, PLLC (57) ABSTRACT

A user identifier of a customer may be obtained from a customer identification database of a wireless telecommunication carrier in response to receiving a support request to resolve a service issue for the customer. Subsequently, a determination may be made based on the user identifier as to whether the customer satisfies one or more conditions. The one or more conditions may include that the customer is previously assigned to a customer support team of the wireless telecommunication carrier for a prior support session, a service account associated with the user identifier is already assigned to the customer support team, or the customer was formerly assigned to the customer support team while using a former service account that is now expired. Accordingly, the customer support team may be designated to assist the customer with the service issue when the customer satisfies a condition of the one or more conditions.

20 Claims, 6 Drawing Sheets

TEAM-BASED CUSTOMER CARE ROUTING

BACKGROUND

Mobile devices are integral to the daily lives of most users. Mobile devices are used to make voice calls, check email and text messages, update social media pages, stream media, browse websites, and so forth. As a result, users of mobile devices expect a wireless telecommunication carrier to provide constant and reliable telecommunication and data communication services at all times.

The reliability of telecommunication and data communication services may be affected by multiple factors, such as geography and terrain, device features and capabilities, as well as network infrastructure and network coverage deployment. Thus, when customers experience service issues, the customers may initiate calls or chat sessions with a customer care department of the wireless telecommunication carrier. However, while the customer care department is committed to providing dedicated customer service, the performance of the customer care department may be occasionally hampered by infrastructural and logistical inefficiencies. For example, customer care teams may be based at different locations and work conflicting hours. Different customer service representatives may be trained on different policies and procedures. Further, some customer service representatives may lack the technical expertise or training to efficiently resolve the service issue for a customer, which may result in the customer being transferred to other customer service representatives. Such hurdles may leave a customer with the impression that the customer service representatives of the carrier are not dedicated to provide high quality customer service, and that customer care is an opaque bureaucratic process that frustrates as much as helps the customer.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for routing telephone calls or online chat messages of a customer with service issues to a dedicated team of customer support representatives of a wireless telecommunication carrier. Once a team of customer support representatives is assigned to a customer, the team of customer support representatives may continue to serve the customer as long as the customer subscribes to the wireless communication service provided by the wireless telecommunication carrier. The team of customer support representatives may include representatives that are experts at solving different service issues. For example, the service issues may include an account issue, a retail issue, a device issue, a network issue, a web issue, and/or so forth. Accordingly, as the customer interacts with the representatives of the team on an ongoing basis, a sense of trust and rapport may be fostered between the customer and the one or more customer service representatives.

In various embodiments, a service routing engine of the wireless telecommunication carrier may initially assign a customer support team to a particular customer based on one or more factors. Such factors may be the workloads of customer support teams, the geographical proximity of the customer support teams to the geolocation of the customer, the correlation between the collective service expertise of the customer support teams and a current service issue experienced by the customer, and/or so forth. Other factors may include whether a current service account or a former service account associated with the customer is already assigned to a particular customer support team. For example, a customer may be a member of a family service account, and another member of the family service account may already have a particular customer support team assigned. In such an example, the customer may be assigned to the particular customer support team as well. In another example, a customer may be a returning customer who was assigned to a certain customer support team while using an old service account. In such an example, the customer may be reassigned to the same customer support team upon returning to the wireless telecommunication carrier.

Once the customer has interacted with a particular customer service representative of a customer support team, the customer may be preferentially rerouted to the same representative for subsequent interactions. Nevertheless, the support routing engine may route the customer to another representative on the customer support team when an expertise rating of a particular representative with a specific service issue experienced by the customer fails to meet a predetermined expertise threshold. Further, the support routing engine may also reroute the customer to another representative on the customer support team when a customer satisfaction rating the customer assigned to the particular representative fails to meet a predetermined rating threshold. In at least some embodiments, a customer support team may include both remote customer service representatives that operate from a support center and/or in-store customer service representatives that are present at the physical stores of the wireless telecommunication carrier.

Accordingly, the assignment of a dedicated customer support team of customer service representatives to assist a customer with service issues on an on-going basis may improve operational efficiency, representative accountability, and foster greater customer trust in the ability of the representatives to quickly resolve service issues. Thus, the techniques described herein may increase customer satisfaction and customer retention by providing attentive customer care service to the customer. Further, the techniques described herein may be implemented in a number of ways. Example implementations are provided below with reference to the following figures.

Example Architecture

Figure 1:
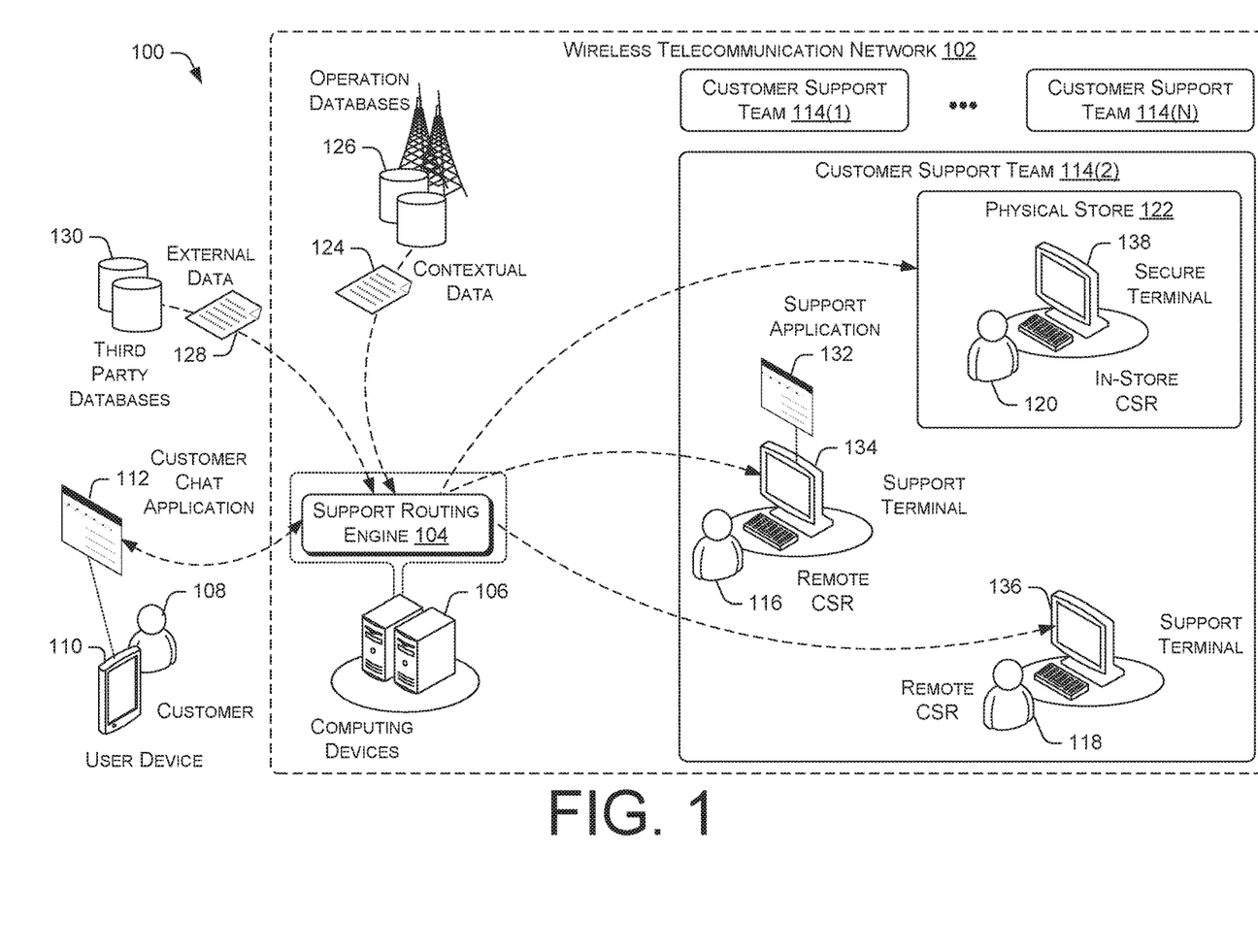
FIG. 1 illustrates an example architecture for deploying team-based customer care routing to route customers with service issues to a customer support team of a wireless telecommunication carrier.

FIG. 1 illustrates an example architecture 100 for deploying team-based customer care routing to route customers with service issues to a customer support team of a wireless telecommunication carrier. The architecture 100 may include a wireless telecommunication network 102 that is operated by a wireless telecommunication carrier. The wireless telecommunication network 102 may provide a wide range of mobile communication services, as well as ancillary services and features, to subscribers and associated mobile device users. In various embodiments, the wireless telecommunication network 102 may provide wireless communication between multiple user devices. Further, the wireless telecommunication network 102 may also provide communications between the multiple user devices and other user devices that are serviced by other telecommunication networks. In various embodiments, the user devices may include mobile handsets, smart phones, tablet computers, personal digital assistants (PDAs), smart watches, and/or electronic devices.

The wireless telecommunication network 102 may be implemented using multiple interconnected networks. In various embodiments, the wireless telecommunication network 102 may include multiple Radio Access Networks (RANs). The RANs may be connected to each other via regional ground networks. In turn, the regional ground networks may be connected to a core network by a wide area network (WAN). Each regional portion of the wireless telecommunication network 102 may include one or more RANs and a regional circuit and/or packet switched network and associated signaling network facilities.

A RAN of the wireless telecommunication network 102 may include a number of base stations. In some embodiments, the base stations may be in the form of eNodeB nodes. Each eNodeB node may include a base transceiver system (BTS) that communicates via an antennae system over an air-link with one or more user devices that are within range. The BTS may send radio communication signals to user devices and receive radio communication signals from user devices. The radio access networks may carry the communications of the user devices between the respective base stations and the core network. The core network may connect to a public packet data communication network, such as the Internet. Packet communications via the RANs, the core network, and the Internet may support a variety of services through the wireless telecommunication network 102.

The wireless telecommunication network 102 may further include a support routing engine 104 that executes on one or more computing devices 106. The one or more computing devices 106 may include general purpose computers, such as desktop computers, tablet computers, laptop computers, servers, or other electronic devices that are capable of receive inputs, process the inputs, and generate output data. In still other embodiments, the one or more computing devices 106 may be virtual computing devices in the form of computing nodes, such as virtual machines and software containers. In various embodiments, the computing devices 106 may be controlled by a wireless telecommunication carrier that provides the wireless telecommunication network 102, and/or controlled by a third-party entity that is working with the mobile telecommunication carrier.

The support routing engine 104 may route incoming support requests from customers with service issues to customer service representatives of the wireless telecommunication carrier. In various embodiments, the customers may initiate the support requests via telephone calls or online chat session messages. For example, a customer 108 may use the user device 110 to place a telephone support call to a customer care phone number of the wireless telecommunication network 102. Alternatively, the customer 108 may use a customer chat application 112 on the user device 110 to initiate a support chat session request that is intercepted by the support routing engine 104. The customer chat application 112 may be a standalone application or part of a customer support application that is provided to the customer 108 by the wireless telecommunication carrier. The support routing engine 104 may route the customer 108 that has an incoming support request to a particular customer support team based on one or more factors. The customer support team may be one of the customer support teams 114(1)-114(N) deployed by the wireless telecommunication carrier that operates the network 102. A customer support team may include a cohort of customer service representatives that are split into multiple groups. Each of the multiple groups may cover a particular shift in a time period. For example, a first group may cover the first 12 hours of a day, while a second group may cover the second 12 hour of the day. The customer service representatives of a customer support team may include both remote customer service representatives and in-store customer service representatives. The remote customer service representative may correspond to representatives that provide remote support via telephone calls and chat sessions. In contrast, the in-store customer service representatives may provide face-to-face customer assistance at physical locations that are operated by or affiliated with the wireless telecommunication carrier. For example, the customer support team 114(2) may include remote customer service representatives 116 and 118, as well as in-store customer service representative 120 that staffs the physical store 122. In some embodiments, a customer support team may further include internal customer service representatives and external customer service representatives. An internal customer service representative may be an employee or contractor that works directly for the wireless telecommunication carrier. An external customer service representative may be a third-party vendor, a third-party contractor, a crowd-sourced expert, and/or so forth, that does not work directly for the wireless telecommunication carrier.

The factors that are used to assign a customer to a particular customer support team may include whether a current service account or a former service account associated with the customer is already assigned to a particular customer support team. For example, the customer 108 may be a member of a family service account, and another member of the family service account may already have the customer support team 114(1) assigned. In such an example, the customer 108 may be assigned to the customer support team 114(1) as well. In another example, the customer 108 may be a returning customer who was previously assigned to the customer support team 114(2) while using an old service account. In such an example, the customer 108 may be reassigned to the customer support team 114(2) upon returning to the wireless telecommunication carrier. Other factors may include the workloads of customer support teams, the geographical proximity of the customer support teams to the geolocation of the customer, the correlation between the collective service expertise within each customer support team and a current service issue experienced by the customer, and/or so forth. In one example, the customer 108 may be assigned to the customer support team 114(N) because the team is the geographically closest team to a home location or current location of the customer 108.

Following the assignment of the customer 108 to a particular customer support team by the support routing engine 104, the support routing engine 104 may further route the customer 108 to a specific customer service representative of the particular customer support team. In some embodiments, the support routing engine 104 may randomly route the customer 108 to the specific customer service representative. For example, the customer 108 may be randomly routed to the remote customer service representative 116 of the customer support team 114(2). However, in other embodiments, the support routing engine 104 may route the customer 108 to the specific customer service representative based on the service issue associated with the support request of the customer 108.

In the latter embodiments, the support routing engine 104 may use a machine learning classification algorithm to analyze a support request of the customer 108 to determine an actual service issue encountered by the customer 108. For example, in the instance of a telephone call, the customer 108 may have left a brief audio recording that describes a wireless telecommunication service problem encountered by the customer 108. In another example, a support request in the form of an online chat message may include a text description of the wireless telecommunication service problem. The machine learning classification algorithm may match specific words or phrases that the customer used in the support request to a specific service issue. In some embodiments, the machine-learning classification algorithm may also use contextual data 124 from the operation databases 126 and/or external data 128 from the third-party databases 130 to determine the service issue encountered by the customer 108 who initiated the support request.

In various embodiments, the contextual data 124 may include relevant network information, device information, and/or user account information. The network information may include information regarding the technical and operational status of the wireless telecommunication network 102. For example, network information of the network may indicate that Long-Term Evolution (LTE) spectrum coverage (or other spectrum coverage) is unavailable in a particular geographical area or that a network node was temporarily overwhelmed with network traffic at a particular time due to a major event. The device information of user devices may indicate the technical capabilities, feature settings, and operational statuses of user devices. For example, device information for the user device 110 may indicate that Wi-Fi calling is enabled on the user device 110 or that the user device 110 is capable of using a specific communication band provided by the wireless telecommunication network 102. In other examples, the device information for the user device 110 may indicate that Wi-Fi calling is disabled on the user device 110, a developer mode is active on the user device 110, a location tracking service is active on the user device 110, and/or so forth. The user account information for the customer 108 may include account details of multiple users, such as user profile, account type, billing preferences, service plan subscription, and/or so forth.

In some embodiments, the account details for the customer 108 may include a user identifier that the customer 108 has selected to access the services that are provided by the wireless telecommunication network 102 and/or online services provided third-party service providers that are accessible through the wireless telecommunication network 102. In other embodiments, the account details may further indicate that the customer 108 is part of a multi-subscriber service account, such as a group or family subscriber plan. In additional embodiments, the account details may include user preferences for the customer 108, such as contact preferences, marketing preferences, the home location of the customer 108, the current location of the customer 108, and/or so forth. The user account information for the customer 108 may further include billing information, payment history, data consumed, minutes of talk time used, and/or so forth. For example, the account details of the customer 108 may indicate that the customer 108 has a postpaid account and that the customer 108 is current with payments for the subscribed service plan.

The third-party databases 130 may include databases that are provided by entities other than the wireless telecommunication network 102. For example, a third-party database 130 may be provided by a third-party vendor, a third-party contractor, a government entity, another telecommunications carrier, a social media website, and/or so forth. The external data 128 may be network-related information, device-related information, and/or user-related information that supplement the contextual data 124. In some instances, the external data 128 may include regulatory information for networks and devices, device manufacturer information, credit information on users, and/or so forth.

In other instances, the external data 128 may include relevant social media data. The social media data may be provided by social networking portals. Social media portals may include a portal that is established by the wireless telecommunication carrier, a portal that is maintained by a third-party service provider for users to share social media postings, and/or a portal that is created and maintained by a particular user solely for the particular user to present social postings. The social media portals may be mined by the support routing engine 104 for external data that is relevant to the issue that the customer 108 is experiencing with the user device 110 or another user device. For example, social media posting may indicate that a particular geographical area has poor network coverage, a particular model of a user device has below average signal reception, a certain operating system of a user device is prone to a specific software virus, and/or so forth. Accordingly, the support routing engine 104 may use a correlation algorithm to correlate the relevant information mined from the social media portals to the customer 108 and/or the user device 110.

The machine learning classification algorithm of the support routing engine 104 may use the contextual data 124 and/or the external data 128 in conjunction with the support request of a customer to determine a service issue that is experienced by the customer 108. For example, if the contextual data 124 indicates that a particular network cell proximate to a geolocation of the customer 108 is experiencing service disruptions, and the support request from the customer 108 states that "my LTE is not working" the machine learning classification algorithm may determine that the service issue is a lack of network coverage. In another example, if the external data 128 indicates that a web browser on a particular model of user device has stopped working after a software upgrade, and the support request from the customer 108 states that "I can't get on the Internet," the machine learning classification algorithm may determine that the service issue is improper device software configuration.

Following the determination of a service issue that is associated with a support request from the customer 108, the support routing engine 104 may select a customer service representative on the customer support team 114(2) to assist the customer 108 with the service issue. For example, the remote customer service representative 118 may be selected to assist the customer 108. The customer service representative may be selected based on one or more qualifications. The one or more qualifications may include having an expertise rating with the service issue that is above a predetermined rating threshold, or an expertise rating that is highest among all available customer service representatives on the customer support team 114(2). In instances in which the customer service representative was previously rated by the customer 108, the one or more qualifications may include having a satisfaction rating with the customer 108 that is higher than a predetermined satisfaction threshold.

In some embodiments, the support routing engine 104 may further determine whether to route a service issue to a remote customer service representative 116 or an in-store customer service representative 120. In such embodiments, the support routing engine 104 may use a machine-learning classification algorithm to determine a root cause of the service issue. Upon determining the root cause, the support routing engine 104 may generate a solution that remedies the root cause from information stored in a solutions database. The root cause may be used by the machine-learning classification algorithm to classify the service issue as an issue that is preferentially resolved via remote support or via in-person support. For example, the support routing engine 104 may route a service issue that is caused by a software problem for remote support by a remote customer service representative 116. On the other hand, a service issue that is caused by a hardware problem may be routed to in-person support by an in-store customer service representative 120. In at least one embodiment, in addition to meeting the expertise rating thresholds and/or satisfaction rating qualifications, the in-store customer service representative 120 that is selected may have the closest proximity to a home location or a current location of the customer 108.

Once a customer service representative is selected to handle the service issue of the customer 108, the customer service representative may engage in a support session with the customer 108 via a support application 132. In instances in which the support session is an online chat session, a customer service representative may use the support application 132 to provide support to the customer 108. For example, the remote customer service representative 116 may use the support application 132 to engage in the support session. The support application 132 may be a chat program that reside on the support terminal 134 of the remote customer service representative 116. Likewise, the remote customer service representative 118 may use a support terminal 136 to assist the customer 108. Alternatively, if the support session is a telephone call, a customer service representative may engage in telephonic voice communication with the customer 108.

Additionally, the support terminals 134 and 136 may be further used to access various types of data as the customer service representatives provide assistance to the customer 108. The data may include the contextual data 124, the external data 128, the data generated by the support routing engine 104, and/or so forth. In some scenarios, a customer service representative may schedule a future online chat session or arrange for a future call back to the customer 108 at a mutually agreed time. The in-store customer service representative 120 at the physical store 122 may have access to a secure terminal 138. The secure terminal 138 may be used to access the contextual data 124, the external data 128, the data generated by the support routing engine 104, and/or so forth, as the in-store customer service representative 120 works to resolve a service issue for the customer 108.

The support routing engine 104 may further grade the expertise of the customer service representatives that provided support to a customer for a service issue. For example, the support routing engine 104 may increase the expertise rating of a customer service representative with respect to a service issue if the customer service representative is able to successfully resolve the service issue for the customer. On the other hand, if the customer service representative is unable to resolve a service issue for a customer, the support routing engine 104 may decrease the expertise rating of the customer service representative with respect to the service issue. Further, the support routing engine 104 may also modify the machine-learning algorithms based on the specific circumstances under which service issues are resolved to generate more accurate root causes and solutions for service issues.

Example Computing Device Components

Figure 2:
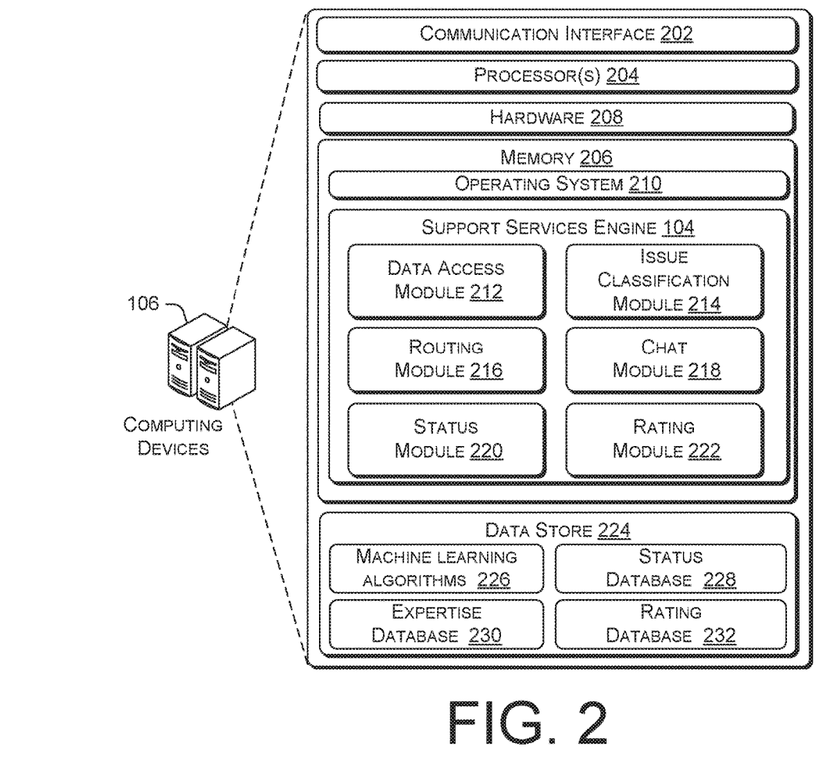
FIG. 2 is a block diagram showing various components of one or more illustrative computing devices that implement a support routing engine that routes customers with service issues to a customer support team of the wireless telecommunication carrier.

FIG. 2 is a block diagram showing various components of one or more illustrative computing devices that implement a support routing engine that routes customers with service issues to a customer support team of the wireless telecommunication carrier. The computing devices 106 may include a communication interface 202, one or more processors 204, memory 206, and hardware 208. The communication interface 202 may include wireless and/or wired communication components that enable the computing devices 106 to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 106 may implement an operating system 210. In turn, the operating system 210 may provide an execution environment for the support routing engine 104. The operating system 210 may include components that enable the computing devices 106 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The support routing engine 104 may include a data access module 212, an issue classification module 214, a routing module 216, a chat module 218, a status module 220, and a rating module 222. The modules may include routines, program instructions, objects, and/or data structures that perform particular tasks or implement particular abstract data types. The memory 206 may also include a data store 224 that is used by the support routing engine 104.

The data access module 212 may receive support requests from telephone calls or online chat session messages. The telephone calls and the online chat session messages may be routed to the support routing engine 104 via a customer communication routing function of the wireless telecommunication network 102. In instances in which a support request is from a telephone call, the data access module 212 may use a speech-to-text engine to generate a text version of the verbal support request. However, in instances in which a support request is from an online chat session, the data access module 212 may save the support request from the corresponding text message.

The data access module 212 may retrieve data from the operation databases 126 and the third-party databases 130. In various embodiments, the data access module 212 may retrieve data that are relevant to a particular user device or customer from the databases. The relevant data for a user device or the customer may include any of the contextual data 124 and the external data 128 that are related to the provision of telecommunication services to the user device by the wireless telecommunication network 102.

In some embodiments, the data access module 212 may have the ability to directly query a user device for device information. In such embodiments, a query that is initiated by the data access module 212 may be received by a device management application on the user device. In turn, the device management application may provide a response that includes the device information being queried. For example, the data access module 212 may initiate a query to determine whether Wi-Fi calling is enabled on a user device, and the device management application may respond with the Wi-Fi calling enablement status of the user device. In at least one embodiment, a customer may have the ability to select whether device management application is to respond to queries from the data access module 212 through a configuration setting of the application. In this way, the user may be given an opportunity to opt out of providing information to the data access module 212. Accordingly, in some instances, the data access module 212 may supplement a support request with relevant data from the operation databases 126 and/or the third-party databases 130.

The issue classification module 214 may analyze a support request from a customer to determine an underlying service issue that affects the customer. In various embodiments, the issue classification module 214 may use a machine learning classification algorithm to determine a service issue for a support request. The determination may be performed based on descriptive words and/or phrases used by the customer in the support request, the relevant contextual data from the operation databases 126, the third-party databases 130, and/or so forth. The machine learning classification algorithm may further determine a root cause of the service issue. Upon determining the root cause, the issue classification module 214 may generate a solution that remedies the root cause based on information stored in a solutions database. In various embodiments, the machine learning classification algorithm may be a naïve Bayes algorithm, a Bayesian network algorithm, a decision tree algorithm, a neural network algorithm, a support vector machine, and/or so forth.

The routing module 216 may assign a customer to a customer support team based on one or more factors. The factors that are used to assign a customer to a particular team may include whether a current service account or a former service account associated with the customer is already assigned to a particular customer support team. Other factors may include the workloads of customer support teams, the geographical proximity of the customer support teams to the geolocation of the customer, the correlation between the collective service expertise of the customer support teams and a current service issue experienced by the customer, and/or so forth. For example, the customer may be assigned to a customer support team that is currently serving the fewest number of customers, which is closest in geographical location to the home location or current location of the customer, or has a highest amount of collective expertise with a service issue experience by the customer. The amount of collective expertise of a customer support team for a service issue may be determined based on a total of all the expertise ratings of all customer support representatives with respect to the service issue.

The routing module 216 may further route a customer to a specific customer service representative of the particular customer support team. The routing module 216 may initially designate a customer service representative to support the customer with a service issue. The representative may be designated as the customer service representative because the representative is available and most recently assisted the customer, the representative is available and interacted most frequently with the customer in the past, the representative is available has the least number of assigned customers, and/or so forth. Alternatively, the representative may be selected at random.

Subsequently, the routing module 216 may analyze an expertise rating of the designated customer service representative with respect to the service issue and a satisfaction rating that the customer assigned to the designated customer service representative. Accordingly, if either the expertise rating or the satisfaction rating of the designate customer service representative falls below a corresponding threshold, the routing module 216 may seek another customer service representative to assist the customer 108.

In some embodiments, the routing module 216 may seek another customer service representative by determining whether the customer 108 has interacted with other customer service representatives on the particular customer support team that are available to assist the customer. A customer service representative may be considered available by the routing module 216 if the representative is able to either immediately engage in a support session with a customer or engage in a support session at a future scheduled time requested by the customer. In other words, an available customer service representative may provide synchronous, i.e., immediate customer support or asynchronous, i.e., future customer support. Thus, if no other representatives on the team have previously interacted with the customer 108, the routing module 216 may assign an available customer service representative on the customer support team with a highest expertise rating for the service issue to assist the customer. On the other hand, if there are customer service representatives that have previously interacted with the customer 108, the routing module 216 may select one of such representatives having a customer satisfaction rating and an expertise rating with the service issue that are both above corresponding thresholds to support the customer 108.

The chat module 218 may host chat sessions that are accessible by the customers and the customer service representatives via chat client applications. For example, the customer 108 may initiate and participate in a chat session through the customer chat application 112. Likewise, the remote customer service representative 116 may initiate and participate in a chat session through the support application 132. The chat session may be established such that the customer 108 and the customer service representative 116 may use corresponding participant identifiers to participate in the chat session. In some instances, the chat module 218 may authenticate the identification credentials provided by each of the customer 108 and the customer service representative 116 prior to establishing the chat session. The chat sessions may be implemented by the chat module 218 using various protocols, such as the Session Initiation Protocol (SIP), SIP Instant Messaging and Presence Leveraging Extensions (SIMPLE), Application Exchange (APEX), Instant Messaging and Presence Protocol (IMPP), Extensible Messaging and Presence Protocol (XMPP), or other messaging protocols.

The chat module 218 may further archive the text messages that are exchanged between customers and customer service representatives. In such instances, the text messages may be stored as chat logs that are tagged with customer identifiers, customer service representative identifiers, dates and times, chat session identifiers, and/or other identification information. Such identification information may be used to query and retrieve specific chat logs. In some embodiments, the chat module 218 may use encryption or security algorithms to ensure that the exchanged text messages are secured from unauthorized viewing.

In some embodiments, the chat module 218 may enable new customer service representatives to join existing chat sessions. In other words, the chat module 218 may provide ways for a customer service representative to share an existing support chat session with a new customer service representative. The chat module 218 may provide the new customer service representative with the opportunity to review archived text messages via an application user interface prior to joining the existing chat session.

The status module 220 may track the statuses of customer service representatives that are in a customer support team. The status of a customer service representative may include active, inactive, or removed. The active status indicates that the customer service representative is assigned to the team and actively working a shift. The inactive status may indicate that the customer service representative is assigned to the team and is currently not working a shift. The removed status may indicate that the customer service representative is no longer assigned to the team. In some instances, when a customer service representative that is permanently removed from a customer support team is a team manager, the status module 220 may generate a notification indicating that the team manager is no longer with the team. In some instances, the notification may be published on a website, a microblog, or a news bulletin board that is operated by the wireless telecommunication carrier. In other instances, the notification may be sent via an electronic communication (e.g., text message, email, etc.) to the customers that are assigned to the customer support team. In instances in which the customer service representative removed from team is someone that directly supports customers, the status module 220 may activate the routing module 216 to transfer the affected customers to other customer service representatives on the customer support team.

The rating module 222 may adjust the expertise rating of a customer service representative based on the performance of the customer service representative in resolving service issues for customers. In various embodiments, the rating module 222 may increase the expertise rating of a customer service representative for a service issue upon a successful resolution of a service issue by the customer service representative. In some instances, the increase may be an award of a predetermined number of expertise points for each time that the customer service representative successfully resolves a particular service issue. In this way, the expertise rating of a customer service representative for a particular service issue may increase as the customer service representative accumulates more and more expertise points with respect to the particular service issue. In other embodiments, the accumulated expertise points may be translated into different levels of expertise ratings according to predetermined standards. For example, an accumulation of 100 expertise points with respect to a service issue may increase an expertise rating of a customer service representative from a low level (e.g., expertise level one) to a higher level (e.g., expertise level two).

The rating module 222 may decrease the expertise rating of a customer service representative for a service issue when the customer service representative is unable to resolve a service issue for a customer. The decrease may be implemented as the deduction of expertise points that a customer service representative has accumulated with respect to a service issue. Accordingly, the deduction may directly decrease the expertise rating of the customer service representative with respect to the service issue. Alternatively, the deduction may drop the expertise rating of the customer service representative with respect to a service issue to a lower level when a predetermined amount of expertise points (e.g., 100 expertise points) is deducted. In additional embodiments, the rating module 222 may award a customer service representative one or more points for resolving a service issue, and no points if the customer service representative is unable to resolve a service issue. The total number of points awarded is then divided by the number of service issues that are dealt with by the rating module 222 to derive an averaged expertise rating for the customer service representative over time. The rating module 222 may determine that a customer service representative is unable to resolve a service issue under several instances. One instance may be when the customer service representative indicates, via a support application, that the customer service representative is unable to resolve a service issue for a customer. Another instance may be when the rating module 222 determines that a follow up support request for the same service issue is received from a customer for the same user device.

The rating module 222 may use other performance metrics of customer service representatives to assess the expertise ratings of the representatives with respect to service issues. In various embodiments, the rating module 222 may track multiple performance metrics related to the performance of customer service representatives with respect to different service issues. Such metrics may include the duration of each support chat session, in which a shorter duration may increase the expertise rating of the customer service representative with respect to a service issue that is the subject of the session. Conversely, a longer duration may decrease the expertise rating of the customer service representative with respect to the service issue. Other metrics may include the number of chat sessions handled in a predetermined time period. In such examples, a higher number of chat sessions pertaining to an issue handled may increase the expertise rating of the customer service representative with respect to the issue as compared to other customer service representatives with lower numbers handled.

The rating module 222 may further provide online or telephonic surveys to customers following the end of support sessions. A survey may ask a customer to describe the specific technical area in which the customer is experiencing a service issue, and whether the service issue was successfully resolved by the customer service representative. In some instances, the survey may ask the customer to provide a satisfaction score for the customer service representative using a numerical scale. For example, the numerical scale may be a star rating scale in which a higher number of stars may indicate that the customer is more satisfied with the customer service representative, and vice versa. Over time, the average of multiple satisfaction scores for the customer service representative from the customer may provide the customer service representative with a satisfaction rating from the perspective of the customer.

The data store 224 may store information that are used or processed by the support routing engine 104. The data store 224 may include one or more databases, such as relational databases, object databases, object-relational databases, and/or key-value databases. The data store 224 may provide storage of the machine learning algorithms 226 that are used by the support service engine. The data store 224 may further store a status database 228, an expertise database 230, and a rating database 232. The status database 228 may contain data regarding the assignment of customer support teams and individual customer service representatives to customers. Furthermore, the status database 228 may be further used by the status module 220 to track the individual statuses of customer service representatives that are in customer support teams.

The expertise database 230 may contain the expertise ratings of customer service representatives with respect to various service issues. For example, the service issues may include items such as Android operating system, Android applications, iPhone OS operating system, iPhone OS applications, network cell configuration, account dispute, Android device hardware, iPhone device hardware, retail device exchange, device accessory acquisition, web services configuration, multimedia service configuration, and/or so forth. The rating database 232 may contain the satisfaction scores and satisfaction ratings that are generated by the customers for the customer service representatives. Additional details regarding the functionalities of the support routing engine 104 are discussed in the context of FIGS. 3-6. Thus, the support routing engine 104 may include other modules and databases that perform the functionalities described in the context of these figures.

Example Processes

FIGS. 3-6 present illustrative processes 300-600 for deploying team-based customer care routing. Each of the processes 300-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-600 are described with reference to the architecture 100 of FIG. 1.

Figure 3:
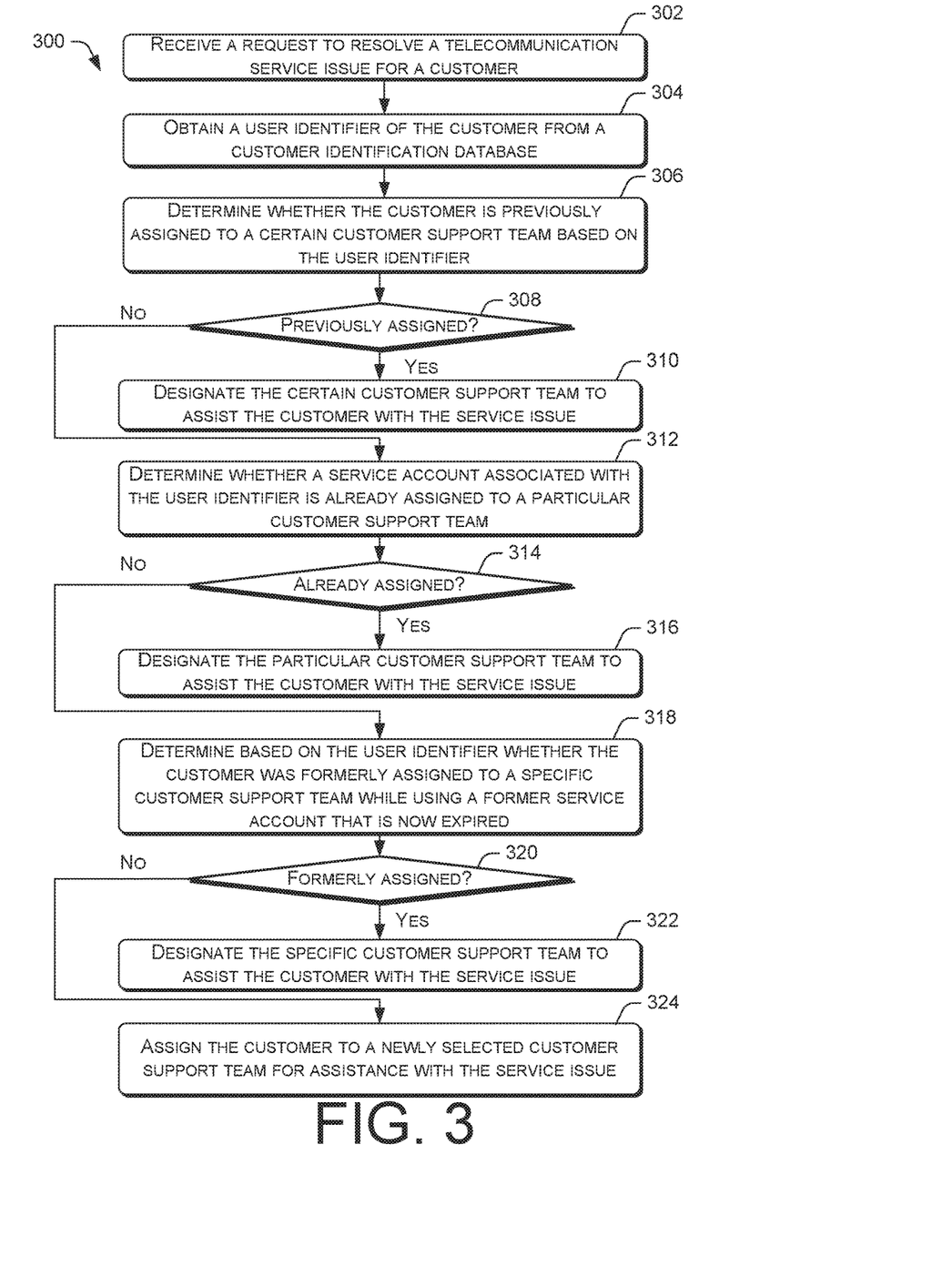
FIG. 3 is a flow diagram of an example process for routing a support request of a customer to a customer service representative of a customer support team based on a user identifier of the customer.

FIG. 3 is a flow diagram of an example process 300 for routing a service issue resolution request of a customer to a customer service representative of a customer support team based on a user identifier of the customer. At block 302, the support routing engine 104 may receive a request to resolve a telecommunication service issue for a customer. In various embodiments, the request may be initiated via a chat session or a telephone call requesting support for the service issue. At block 304, the support routing engine 104 may obtain a user identifier of the customer from a customer identification database. The customer may be contacting a wireless telecommunication carrier via a chat session or a telephone call requesting support for a service issue with a user device. In various embodiments, the customer identification database may be one of the operational databases 126 or a dedicated database that stores customer account information obtained from the operational database 126. In some instances, the support routing engine 104 may query the customer identification database for a user identifier that the correlates with a device identifier of the user device. In other instances, the support routing engine 104 may retrieve the user identifier from the customer identification database based on secondary identification information (e.g., user name, social security number, billing address, and/or so forth) that are provided by the customer.

At block 306, the support routing engine 104 may determine whether the customer is previously assigned to a certain customer support team based on the user identifier. In various embodiments, the support routing engine 104 may make such a determination by retrieving such information from the status database 228 using the user identifier. Thus, at decision block 308, if the support routing engine 104 determines that the customer is previously supported by a certain customer support team, the process 300 may proceed to block 310. At block 310, the support routing engine 104 may designate the certain customer support team to assist the customer with the service issue.

However, if the support routing engine 104 determines at the decision block 308 that the customer was not assigned to the certain customer support team, the process 300 may proceed to block 312. At block 312, the support routing engine 104 may determine whether a service account associated with the user identifier is already assigned to a particular customer support team. For example, a customer may be a member of a family service account, and another member of the family service account may already have a particular customer support team assigned. Thus, at decision block 314, if the support routing engine 104 determines that the service account associated with the user identifier is already assigned to a particular customer support team, the process 300 may proceed to block 316. At block 316, the support routing engine 104 may designate the particular customer support team to assist the customer with the service issue.

However, if the support routing engine 104 determines at the decision block 314 that the service account associated with the user identifier is not assigned to a particular customer support team, the process 300 may proceed to block 318.

At block 318, the support routing engine 104 may determine based on the user identifier whether the customer was formerly assigned to a specific customer support team while using a former service account that is now expired. For example, the customer may be a returning customer who, before leaving the wireless telecommunication carrier, was assigned to a customer support team while on an old service account. Thus, at decision block 320, if the support routing engine 104 determines that the customer was formerly assigned to a specific customer support team, the process 300 may proceed to block 322. At block 322, the support routing engine 104 may designate the specific customer support team to assist the customer with the service issue.

However, if the support routing engine 104 determines at the decision block 320 that the customer was not formerly assigned to a customer support team, the process 300 may proceed to block 324. At block 324, the support routing engine 104 may assign the customer to a newly selected customer support team for assistance with the issue. In various embodiment, the customer support team may be selected for assignment to the customer based on one or more factors. Such factors may be the workloads of customer support teams, the geographical proximity of the customer support teams to the geolocation of the customer, the correlation between the collective service expertise of the customer support teams and a current service issue experienced by the customer, and/or so forth. In some instances, the assignment of the customer to the customer support team may further involve assigning the customer support team to the service account of the customer.

Figure 4:
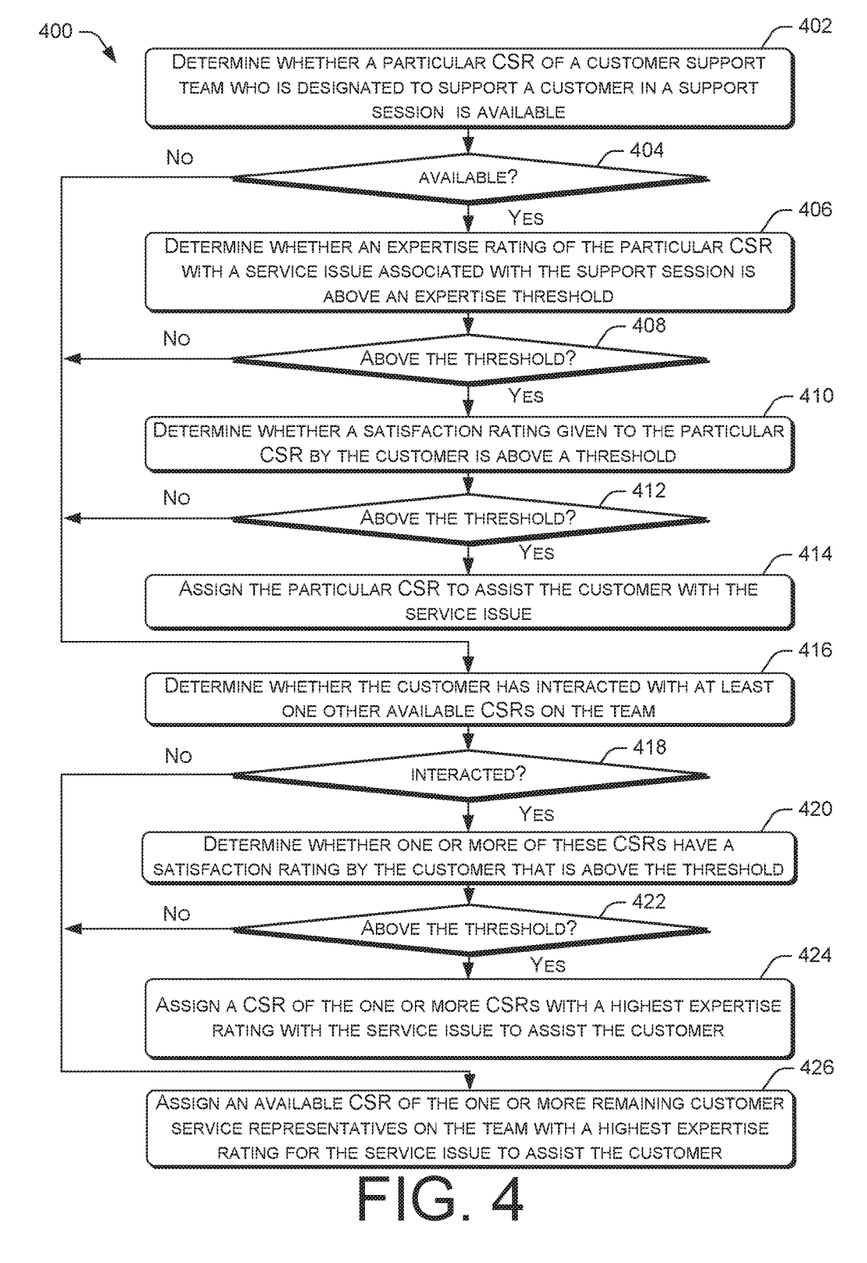
FIG. 4 is a flow diagram of an example process for assigning a customer support representative on a customer support team to assist a customer based on the expertise and a satisfaction rating of the representative.

FIG. 4 is a flow diagram of an example process 400 for assigning a customer support representative on a customer support team to assist a customer based on the expertise and a satisfaction rating of the representative. The process 400 may be performed following the performance of the process 300 that assigns a customer support team to the customer. At block 402, the support routing engine 104 may determine whether a particular customer service representative who is designated to support a customer in a support session is available. For example, the particular customer service representative may have been designated randomly by the support routing engine 104, designated because the customer service representative provided a most recent support session to the customer, or designated for one or more other reasons. The customer service representative may be available when the customer service representative is working and is not currently engaged in assisting another customer, or is working and will not be engaged in assisting another customer at a future scheduled support session requested by the customer. Thus, at decision block 404, if the support routing engine 104 determines that the customer service representative is available, the process 400 may proceed to block 406.

At block 406, the support routing engine 104 may determine whether an expertise rating of the particular customer service representative with a service issue associated with the support session, i.e., the subject of the support session, is above a predetermined expertise rating threshold. In various embodiments, the expertise rating and the expertise rating threshold are numerical values that can be directly compared. An expertise rating that is not above the expertise rating threshold may be an indication that particular customer service representative lacks the expertise to handle the service issue for the customer. Thus, at decision block 408, if the support routing engine 104 determines that the expertise rating of the particular customer service representative with respect to the service issue is above the predetermined expertise rating threshold, the process 400 may proceed to block 410.

At block 410, the support routing engine 104 may determine whether the satisfaction rating given to the particular customer service representative by the customer is above a predetermined satisfaction rating threshold. In various embodiments, the satisfaction rating and the satisfaction rating threshold are numerical values that can be directly compared. A satisfaction rating that is not above the satisfaction rating threshold may be an indication that the customer is generally unsatisfied with the service that the particular customer service representative provided in the past. Thus, at decision block 412, if the support routing engine 104 determines that the satisfaction rating is above the satisfaction rating threshold, the process 400 may proceed to block 414. At block 414, the support routing engine 104 may assign the particular customer service representative to assist the customer with the service issue.

Returning to the decision block 404, if the support routing engine 104 determines that the particular customer service representative is not available, the process 400 may proceed to block 416. At block 416, the support routing engine 104 may determine whether the customer has previously interacted with at least one other available customer service representative on the customer support team in one or more prior support sessions.

Thus, at decision block 418, if the support routing engine 104 determines that the customer has interacted with at least one other available customer service representative, the process 400 may proceed to block 420. At block 420, the support routing engine 104 may determine whether one or more of such customer service representatives have a satisfaction rating by the customer that is above the satisfaction rating threshold.

Thus, at decision block 422, if the support routing engine 104 determines that at least one satisfaction rating of these one or more customer service representatives is above the satisfaction rating threshold, the process 400 may proceed to block 424. At block 424, the support routing engine 104 may assign a customer service representative from these one or more customer service representatives with a highest expertise rating for the service issue to assist the customer.

Returning to decision block 418, if the support routing engine 104 determines that the customer has not interacted with at least one other available customer service representative, the process 400 may proceed to block 426. At block 426, the support routing engine 104 may assign an available customer service representative of the one or more remaining customer service representatives on the customer support team with a highest expertise rating for the service issue to assist the customer. The remaining customer service representatives may include representative that have no previous support session interactions with the customer. Alternatively, an available customer service representative that is assigned by the support routing engine 104 may not have the highest expert rating, but may have an expertise rating with the service issue that is higher than the predetermined expertise threshold. In some embodiments, such an available customer service representative may have a satisfaction rating by the customer that is above the satisfaction rating threshold.

Returning to decision block 408, if the support routing engine 104 determines that the expertise rating of the particular customer service representative with respect to the service issue is not above the predetermined expertise rating threshold, the process 400 may proceed directly to block 416. Likewise, returning to decision block 412, if the support routing engine 104 determines that the satisfaction rating given to the particular customer service representative is not above the satisfaction rating threshold, the process 400 may also proceed directly to block 416. Returning to decision block 422, if the support routing engine 104 determines that none of these one or more customer service representatives has a satisfaction rating by the customer that is above the threshold, the process 400 may proceed directly to block 426.

Figure 5:
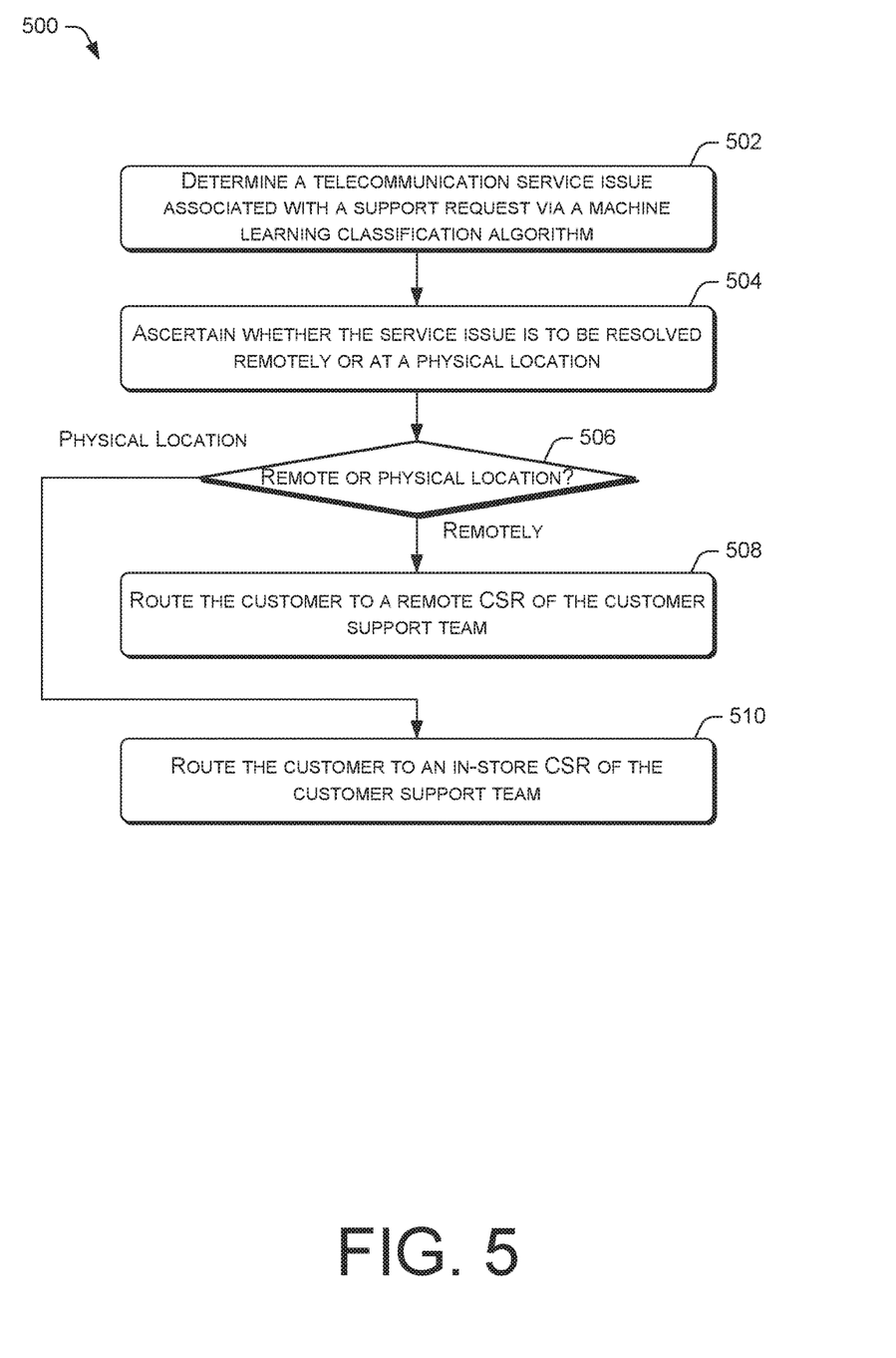
FIG. 5 is a flow diagram of an example process for using a machine learning algorithm to route a customer with a service issue to an online customer service representative or an in-store customer service representative on a customer support team.

FIG. 5 is a flow diagram of an example process 500 for using a machine learning algorithm to route a customer with a service issue to an online customer service representative or an in-store customer service representative on a customer support team. The process 500 may be implemented prior to block 402 of the process 402 as a part of the designation of the particular customer service representative by the support routing engine 104. At block 502, the support routing engine 104 may use a machine-learning classification algorithm to determine a telecommunication service issue that is associated with a support request. In various embodiments, the customer may initiate the support request via a telephone call or a chat session message. The machine learning classification algorithm may match specific words or phrases that the customer used in the support request to a specific service issue.

At block 504, the support routing engine 104 may ascertain whether the service issue is to be resolved remotely or at a physical location. In various embodiments, the support routing engine 104 may use a classification database to perform such routing of the service issue. The classification database may classify each service issue as either an issue that may be resolved remotely, or at a physical location. For example, the support routing engine 104 may route a service issue that is caused by a software problem to remote support by a remote customer service representative. On the other hand, a service issue that is caused by a hardware problem may be routed to in-person support by an in-store customer service representative.

Thus, if the support routing engine 104 determines that the service issue is to be resolved remotely, the process 500 may proceed to block 508. At block 508, the support routing engine 104 may route the customer to a remote customer service representative of the customer support team. However, if the support routing engine 104 determines that the service issue is to be resolved at the physical location, the process 500 may proceed to block 510. At block 510, the support routing engine 104 may route the customer to an in-store customer service representative of the customer support team. In various embodiments, the in-store customer service representative may be at a physical store that is closest to the home location or the current location of the customer.

Figure 6:
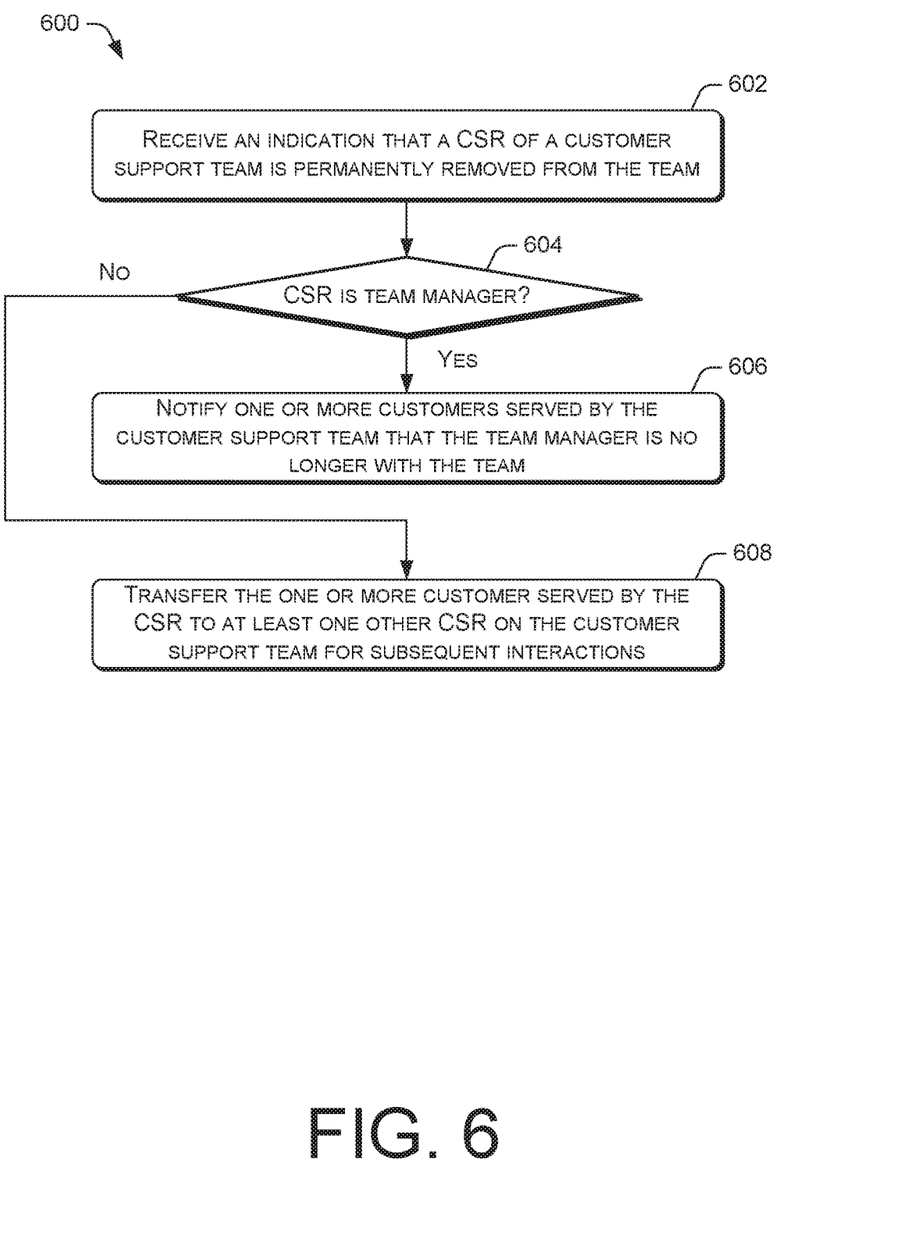
FIG. 6 is a flow diagram of an example process for notifying customers regarding the removal of a customer service representative from a customer support team.

FIG. 6 is a flow diagram of an example process 600 for notifying customers regarding the removal of a customer service representative from a customer support team. At block 602, the support routing engine 104 may receive an indication that a customer service representative of a customer support team is permanently removed from the team. In various embodiments, the customer service representative may be permanently removed from the team upon a termination of the representative, a voluntary separation of the representative from the wireless telecommunication carrier, or an inactivity of the representative with respect to the team for a predetermined amount of time.

At decision block 604, the support routing engine 104 may determine whether a role of the customer service representative indicates that the representative is a team manager. In various embodiments, the roles of the customer service representatives on a customer support team may be stored in the status database 228. Thus, if the support routing engine 104 determines that the customer service representative is a team manager, the process 600 may proceed to block 606. At block 606, the support routing engine 104 may notify one or more customers that are served by the customer support team that the team manager is no longer with the team. In at least one embodiment, the notification may include the identification and contact information for a new team manager of the customer support team. In some instances, the notification may be published on a website, a microblog, or a news bulletin board that is operated by the wireless telecommunication carrier. In other instances, the notification may be sent via an electronic communication (e.g., text message, email, etc.) to the customers that are assigned to the customer support team.

However, if the support routing engine 104 determines that the customer service representative is not a team manager, the process 600 may proceed to block 608. At block 608, the support routing engine 104 may transfer the one or more customers that are served by the customer service representative to at least one other CSR on the customer support team for subsequent actions. In various embodiments, the transfer of each customer may be implemented by the support routing engine 104 using blocks 416-426 of the process 400.

The assignment of a dedicated customer support team of customer service representative to assist a customer with service issues on an on-going basis may improve operational efficiency, representative accountability, and foster greater customer trust in the ability of the representatives to quickly resolve service issues. Thus, the techniques may increase customer satisfaction and customer retention by providing attentive customer care service to the customer.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving text of a support request;
   identifying a service issue for a customer associated with the service request via a machine learning classification algorithm based on the text of the support request;
   obtaining a user identifier of the customer from a customer identification database of a wireless telecommunication carrier in response to receiving the support request, wherein the user identifier is utilized by the customer via a user device to access telecommunication services that are provided by a wireless telecommunication network operated by the wireless telecommunication carrier;

querying the user device to obtain device information related to a provisioning of the telecommunication services to the user device by the wireless telecommunication network;

determining based at least on the user identifier, whether the customer satisfies one or more conditions, the one or more conditions including that the customer is previously assigned to a customer support team of the wireless telecommunication carrier for a prior support session, a service account associated with the user identifier is already assigned to the customer support team, or the customer was formerly assigned to the customer support team while using a former service account that is now expired; and designating the customer support team to assist the customer with the service issue in response to a determination that customer satisfies a condition of the one or more conditions and based on the identified service issue and the obtained device information, the customer support team being one of multiple customer support teams that are operated by the wireless telecommunication carrier.

2. The one or more non-transitory computer-readable media of claim 1, wherein the acts further comprise assigning the customer to a newly selected customer support team of the multiple customer support teams for assistance with the service issue in response to a determination that the customer fails to satisfy any of the one or more conditions.

3. The one or more non-transitory computer-readable media of claim 2, wherein the newly selected customer support team is selected from the multiple customer support teams to assist the customer with the service issue based at least on workloads of the multiple customer support teams, geographical proximities of the multiple customer support teams to a geolocation of the customer, correlations between a collective service expertise of the customer support teams and the service issue, or a random basis.

4. The one or more non-transitory computer-readable media of claim 1, wherein the acts further comprise:

assigning a particular customer service representative of the customer support team to assist the customer with the service issue in response to determining that the customer service representative satisfies a plurality of conditions, the plurality of conditions including that the customer service representative is available to engage in a support session with the customer, an expertise rating of the particular customer service representative with respect to the service issue is above a predetermined expertise threshold, and a satisfaction rating given to the customer service representative by the customer is above a predetermined satisfaction rating threshold; and assigning an alternative customer service representative of the customer support team to assist the customer with the service issue in response to a determination that the customer service representative fails to satisfy any of the plurality of conditions.

5. The one or more non-transitory computer-readable media of claim 4, wherein the particular customer service representative is designated to assist the customer based on a randomly basis or the particular customer service representative having provided a most recent support session to the customer.

6. The one or more non-transitory computer-readable media of claim 4, wherein assigning the alternative customer service representative includes:

assigning a specific customer service representative of multiple customer service representatives on the customer support team that have previously interacted with the customer to assist the customer with the service issue via the support session in response to a determination that the specific customer service representative has a highest expertise rating of the multiple customer service representatives with the service issue and a corresponding satisfaction rating given to the specific customer service representative is above the predetermined satisfaction rating threshold; and assigning an available customer service representative of one or more remaining customer service representatives on the customer support team that have not previously interacted with the customer to assist the customer with the service issue via the support session in response to a determination that the corresponding satisfaction rating of the specific customer service representative is not above the predetermined satisfaction rating threshold, the available customer service representative having a highest expertise rating for the service issue of the one or more remaining customer service representatives.

7. The one or more non-transitory computer-readable media of claim 4, wherein the support session is a current support session or a scheduled future support session with the customer that includes an online chat session, a telephone call, or an in-person interaction.

8. The one or more non-transitory computer-readable media of claim 1, wherein the identifying of the service issue via the machine learning classification algorithm is based on the text of the service request and at least one of contextual data from an operation database of the wireless telecommunication carrier or external data from a third-party database.

9. The one or more non-transitory computer-readable media of claim 8, wherein the contextual data includes at least one of network contextual information regarding technical and operational status of the wireless telecommunication carrier, device contextual information regarding technical capabilities, feature settings, and operational status of a user device, account contextual information that includes account details associated with the user device, and wherein the external data includes social media data.

10. The one or more non-transitory computer-readable media of claim 8, wherein the acts further comprise:

ascertaining whether the service issue is to be resolved remotely or at a physical location;

routing the customer to a remote support session with a remote customer service representative on the customer support team in response to a determination that the service issue is to be resolved remotely, the remote support session is an online chat session or a telephone call; and routing the customer to an in-person interaction with an in-store customer service representative at the physical location in response to a determination that the service issue is to be resolved at the physical location.

11. The one or more non-transitory computer-readable media of claim 1, wherein the customer support team includes multiple customer service representatives having expertise with different service issues.

12. The one or more non-transitory computer-readable media of claim 1, wherein the acts further comprise:
receiving an indication that a customer service representative of the customer support team is permanently removed from the customer support team;
providing a notification to one or more customers served by the customer support team that the customer service representative is no longer with the customer support team in case that the customer service representative is a team manager;
transferring the one or more customers served by the customer service representative to at least one other customer service representative for subsequent interactions in case that the customer service representative is not a team manager.

13. A computer-implemented method, comprising:
receiving, at one or more computing devices, text of a support request from a customer of a wireless telecommunication carrier for a service issue via on online chat session or a telephone call;
identifying the service issue for the customer via a machine learning classification algorithm based on the text of the support request;
determining, at the one or more computing devices, based at least on a user identifier of the customer whether the customer satisfies one or more conditions, the one or more conditions including that the customer is previously assigned to a customer support team of the wireless telecommunication carrier for a prior support session, a service account associated with the user identifier is already assigned to the customer support team, or the customer was formerly assigned to the customer support team while using a former service account that is now expired;
designating, at the one or more computing devices, the customer support team to assist the customer with the service issue in response to a determination that customer satisfies a condition of the one or more conditions and based on the identified service issue, the customer support team being one of multiple customer support teams that are operated by the wireless telecommunication carrier; and
assigning, via the one or more computing devices, the customer to a newly selected customer support team of the multiple customer support teams for assistance with the service issue in response to a determination that the customer fails to satisfy any of the one or more conditions.

14. The computer-implemented method of claim 13, wherein the newly selected customer support team is selected from the multiple customer support teams to assist the customer with the service issue based at least on workloads of the multiple customer support teams, geographical proximities of the multiple customer support teams to a geolocation of the customer, correlations between a collective service expertise of the customer support teams and the service issue, or a random basis.

15. The computer-implemented method of claim 13, further comprising:
assigning a particular customer service representative of the customer support team to assist the customer with the service issue in response to determining that the customer service representative satisfies a plurality of conditions, the plurality of conditions including that the customer service representative is available to engage in a support session with the customer, an expertise rating of the particular customer service representative with respect to the service issue is above a predetermined expertise threshold, and a satisfaction rating given to the customer service representative by the customer is above a predetermined satisfaction rating threshold; and
assigning an alternative customer service representative of the customer support team to assist the customer with the service issue in response to a determination that the customer service representative fails to satisfy any of the plurality of conditions.

16. The computer-implemented method of claim 15, wherein the particular customer service representative is designated to assist the customer based on a randomly basis or the particular customer service representative having provided a most recent support session to the customer.

17. The computer-implemented method of claim 15, wherein assigning the alternative customer service representative includes:
assigning a specific customer service representative of multiple customer service representatives on the customer support team that have previously interacted with the customer to assist the customer with the service issue via the support session in response to a determination that the specific customer service representative has a highest expertise rating of the multiple customer service representatives with the service issue and a corresponding satisfaction rating given to the specific customer service representative is above the predetermined satisfaction rating threshold; and
assigning an available customer service representative of one or more remaining customer service representatives on the customer support team that have not previously interacted with the customer to assist the customer with the service issue via the support session in response to a determination that the corresponding satisfaction rating of the specific customer service representative is not above the predetermined satisfaction rating threshold, the available customer service representative having a highest expertise rating for the service issue of the one or more remaining customer service representatives.

18. A system, comprising:
one or more processors; and
memory including a plurality of computer-executable components that are executable by the one or more processors to perform a plurality of actions, the plurality of actions comprising:
receiving text of a support request;
identifying a service issue for a customer associated with the service request via a machine learning classification algorithm based on the text of the support request;
obtaining a user identifier of the customer from a customer identification database of a wireless telecommunication carrier in response to receiving the support request to resolve the service issue for the customer;
determining based at least on the user identifier, whether the customer satisfies one or more conditions, the one or more conditions including that the customer is previously assigned to a customer support team of the wireless telecommunication carrier for a prior support session, a service account associated with the user identifier is already assigned to the customer support team, or the customer was formerly assigned to the customer support team while using a former service account that is now expired;

designating the customer support team to assist the customer with the service issue in response to a determination that customer satisfies a condition of the one or more conditions and based on the identified service issue, the customer support team being one of multiple customer support teams that are operated by the wireless telecommunication carrier;

assigning a particular customer service representative of the customer support team to assist the customer with the service issue in response to determining that the customer service representative satisfies a plurality of conditions, the plurality of conditions including that the customer service representative is available to engage in a support session with the customer, an expertise rating of the particular customer service representative with respect to the service issue is above a predetermined expertise threshold, and a satisfaction rating given to the customer service representative by the customer is above a predetermined satisfaction rating threshold; and assigning an alternative customer service representative of the customer support team to assist the customer with the service issue in response to a determination that the customer service representative fails to satisfy any of the plurality of conditions.

19. The one or more non-transitory computer-readable media of claim 1,
wherein the acts further comprise:
receiving the support request via an online chat session or via a telephone call;
in response to receiving the support request via the telephone call, generating the text of the support request with a speech-to-text engine; and
in response to receiving the support request via the online chat session, saving the text of the support request.

20. The system of claim 18, wherein the plurality of actions further comprise:
receiving the support request via an online chat session or via a telephone call;
in response to receiving the support request via the telephone call, generating the text of the support request with a speech-to-text engine; and
in response to receiving the support request via the online chat session, saving the text of the support request.

\* \* \* \* \*